Solution Viscosity (SV) of Polycaprolactam when adding increasing amounts of Hexamethylenediamine (Curve 1) or Ethylene Carbonate (Curve 2)

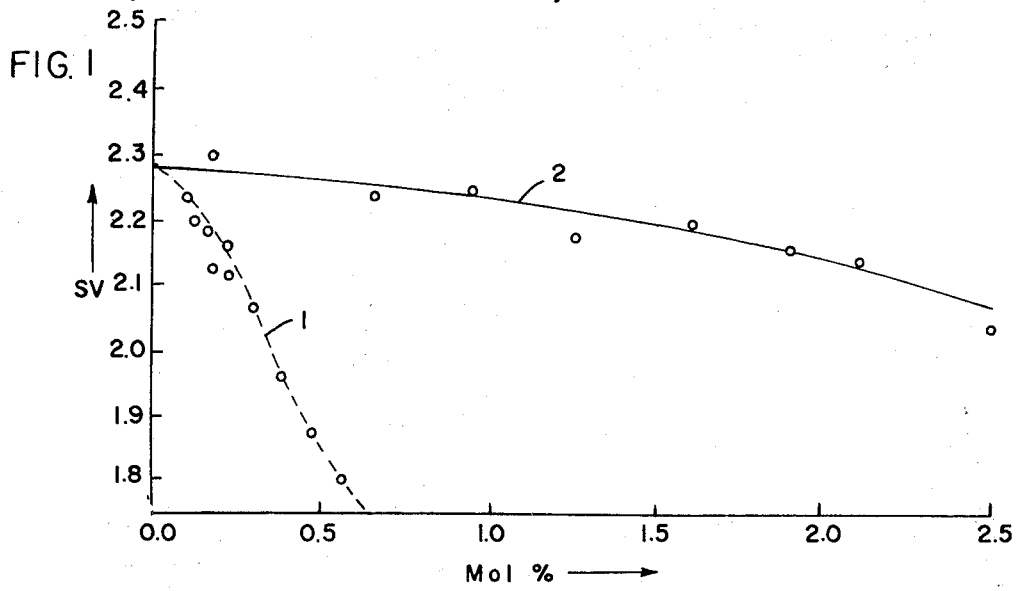

FIG. 1

Solution Viscosity (SV) of Polycaprolactam with the added amount of Hexamethylenedimine held constant in each curve while varying the added amount of Ethylene Carbonate

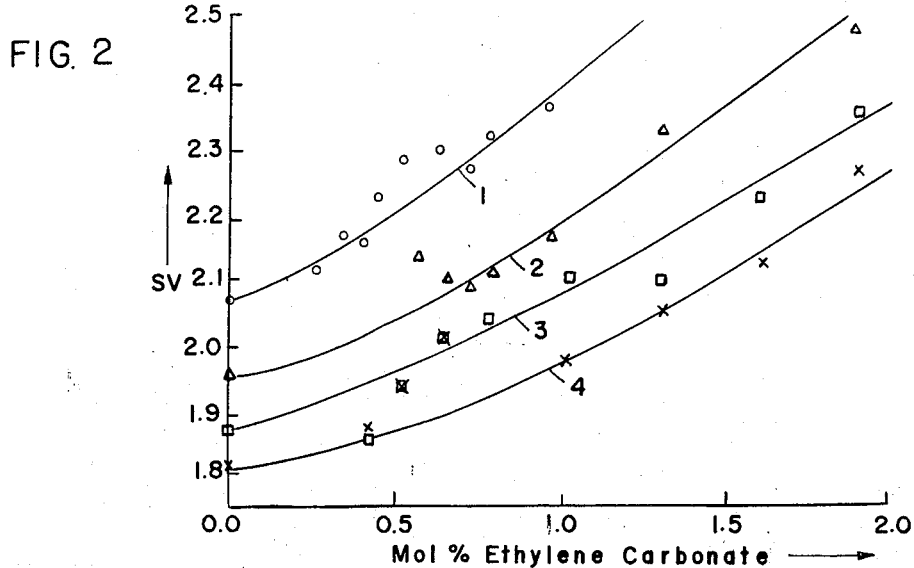

FIG. 2

| Curve | Symbol | Mol % of Hexamethylene Diamine |
|---|---|---|
| 1 | - o - | 0.290 |
| 2 | - △ - | 0.384 |
| 3 | - □ - | 0.481 |
| 4 | - x - | 0.576 |

INVENTORS:
KLAUS GERLACH
WOLFGANG GRIMM
HELMUT LINHART

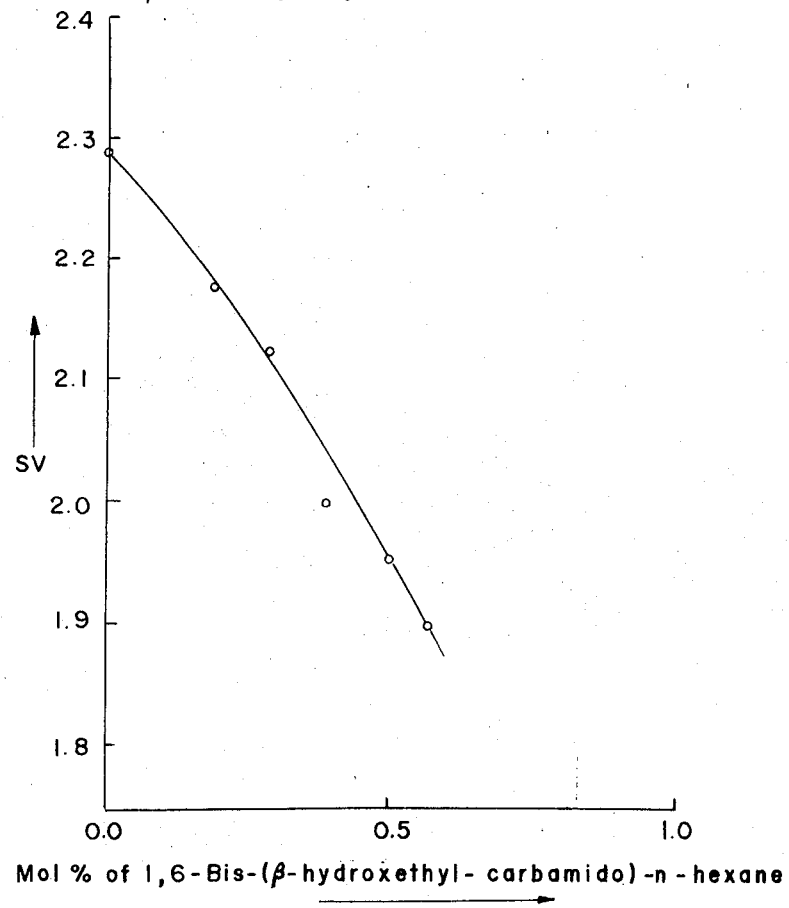

United States Patent Office 3,644,298
Patented Feb. 22, 1972

3,644,298
PRODUCTION OF FIBER-FORMING POLYAMIDES OF IMPROVED DYEABILITY
Klaus Gerlach, Obernau, Wolfgang Grimm, Erlenbach, and Helmut Linhart, Aschaffenburg, Germany, assignors to Glanzstoff AG, Wuppertal, Germany
Filed Jan. 13, 1969, Ser. No. 790,640
Claims priority, application Germany, Jan. 13, 1968,
P 17 20 886.5
Int. Cl. C08g 20/20
U.S. Cl. 260—78 R
14 Claims

ABSTRACT OF THE DISCLOSURE

Process for improving the dyeability of high molecular weight linear fiber-forming synthetic polyamides while retaining sufficient solution viscosity wherein there is added to the initial polyamide-forming monomeric reactant, prior to or during its conventional polycondensation, (A) an alkylene diamine such as hexamethylene diamine and (B) a carbonic acid ester such as ethylene carbonate. The resulting product has a much higher affinity for acid dyes while avoiding certain disadvantages of adding (A) or (B) alone.

---

It is known that the affinity of linear synthetic polyamides for acid dyestuffs can be improved by increasing the number of terminal amino groups present in the polymer molecule. This increase in the affinity, i.e., in the dyeability, can be achieved by adding various amino compounds to the monomers which are polycondensed to form the polyamide, e.g. where the monomers are lactams, ω-amino-carboxylic acids or the mixtures and salts of dicarboxylic acids and diamines. However, this increase in dyeability is always accompanied by a deterioration in the physical properties of the polyamide and of the filaments, threads or fibers which are produced from these polymers. This deterioration is essentially caused by the fact that these amino additives act as chain-breaking agents as evidenced by a reduction in solution viscosity. For example, if caprolactam is polymerized in the presence of only 0.3 mol percent of a diamine, a polyamide with a solution viscosity ($\eta_{rel}$) of only 2.07 is obtained, whereas the solution viscosity of a polyamide produced without such as additive is 2.29. An addition of 0.4 mol percent of the diamine lowers the solution viscosity of the polyamide to a value of only 1.96. It will be found by experience that considerable difficulties are encountered when spinning polyamides having such low solution viscosities, since the melt tends to form drops during extrusion or spinning in the spinneret. Furthermore, it is not possible to spin such polyamides of low viscosity into filaments having a satisfactory profile or shaped cross-section, such as those which are required for a variety of uses, e.g. for carpet yarns or for very fine denier filaments and yarns which are to be texturized.

In order to obtain a greater improvement in the dyeability without at the same time reducing the viscosity of the polyamide too much, attempts have been made to add certain compounds which counteract or inhibit the chain-breaking effect. Phosphoric and phosphonic acid esters have generally been proven to be suitable for this purpose. The addition of both diamines and phosphoric or phosphonic acid esters is only possible, however, within certain limits. This result arises because, while the phosphorus compounds are certainly able to minimize the decrease in viscosity, they also lead to a cross-linking of the polyamide and consequently to a different type of deterioration in the spinning properties or the final fiber properties.

Carbonic acid esters have been used as reaction accelerators in the so-called ionic polycondensation of lactams, which is catalyzed by alkali or alkaline-earth metals or their hydrides, amides, hydroxides, oxides, alkoxides or carbonates. Under the particular conditions of ionic polycondensation, these carbonic acid esters make it possible to reduce the reaction temperatures and also lead to a shortening of the reaction times. The conventional lactam polycondensation reactions, which are usually carried out in the presence of more or less large quantities of water, show no improvement in processing conditions when adding the carbonic acid esters.

An object of the present process is to improve the dyeability of linear fiber-forming polyamides, while at the same time maintaining the normal viscosity values and other physical properties of not only the polymers but also the threads, filaments, fibers, bristles or other shaped products which can be produced from the polymers. Other objects and advantages of the invention will become more apparent upon consideration of the following detailed disclosure.

It has now been found in accordance with the invention that the dyeability with acid dyes of a fiber-forming synthetic linear polyamide as obtained from lactams, ω-aminocarboxylic acids or the substantially equimolar mixtures and salts of dicarboxylic acids and diamines, can be improved without impairing the other desirable properties of these polyamides if certain alkylene diamines and carbonic acid esters are added as a synergistic combination to the initial monomeric reactant for the polyamide or to the reaction mixture during its polycondensation.

More particularly, the invention provides a process for improving the dyeability of those fiber-forming polyamides prepared by the conventional polycondensation of a monomeric reactant selected from the class consisting of lactams, ω-aminocarboxylic acids or the mixtures and salts of a substantially equimolar proportion of dicarboxylic acids and diamines, which process comprises carrying out the polycondensation with an addition of (A) 0.1 to 0.75 mol percent of a diamine of the formula

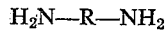

in which R is an alkylene group containing 2 to 12 carbon atoms, a hydroaromatic ring structure with 5 or 6 carbon atoms or the group:

wherein $m$ and $n$ are numbers from 1 to 5; or an aliphatic polyamine of the formula

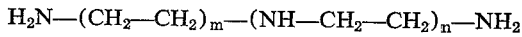

wherein $m$ is a number from 1 to 6 and $n$ from 1 to 4, and (B) 0.1 to 2.5 mol percent of a carbonic acid ester of a primary or secondary mono- or dihydric alcohol, the molar percentages being taken with reference to the number of mols of the monomeric reactant. It is preferred to use 0.3 to 0.6 mol percent of the alkylene diamine and 0.1 to 1.0 mol percent of the carbonic acid ester. It is particularly preferred to use 0.3 to 0.5 mol percent of the carbonic acid ester.

In referring to a "conventional" polycondensation of certain monomeric reactants to produce a fiber-forming polyamide, it will be understood that the polycondensation reaction is to be carried out in the presence of a substantial amount of water, e.g. at least 2% by weight with reference to the total reaction mixture, i.e. as an aqueous solution of the monomeric reactant. No special catalyst is required in this conventional polycondensation reaction, and in fact it is preferable to avoid the use of a catalyst as such, since the reaction proceeds readily in the presence of water as is well known. The polycondensation is preferably carried out or at least initiated under an inert atmosphere, e.g. nitrogen, and the reaction temperature is in the conventional range of about 270 to 280° C.

It should be noted that the monomeric reactant may be a lactam such as caprolactam or higher lactams up to about 12 carbon atoms or an ω-aminocarboxylic acid characterized by an alkylene hydrocarbon chain, e.g. of 6 to 12 carbon atoms, with the amino group (—$NH_2$) at one end and the carboxyl group (—COOH) at the other end, or it may be a mixture or salt of the usual aliphatic dicarboxylic acids and aliphatic diamines in which each component of the mixture or salt is present in substantially the same molar amount. Thus, in this latter case where one uses an acid-amine salt, e.g. the so-called AH-salt which is also referred to as hexamethylene diammonium adipate, the total mols of the monomeric reactant should include the mols of the dicarboxylic acid plus the mols of the diamine, just as these would be separately calculated in a simple mixture of the two components.

The polycondensation step of the invention is thus conventional except for the addition of the alkylene diamine (A) and the carbonic acid ester (B). In general, it is desirable to conduct the polycondensation for a period of time sufficient to provide a solution viscosity of the condensed product of about 2.10 to 2.60.

It is especially desirable to use straight-chain alkylene diamines with terminal primary amino groups as component (A) of the invention. However, those diamines having a branched chain or diamines with aromatic or hydroaromatic groups can also be employed, provided that they do not contain any other functional substituents, apart from the amino groups. Saturated aliphatic diamines with secondary amino groups may be used, e.g. the various polyalkylene polyamines. In general, these diamines preferably contain about 2 to 8 carbon atoms, and particularly good results are achieved with hexamethylene diamine. When using this specific diamine in combination with a monomeric reactant of the same compound, it will be understood that the amount of the additive (A) in accordance with the invention represents an excess over that amount required as an initial monomer.

Among many suitable alkylene diamines falling within the above-noted limitations, the following can set forth by way of example:

Ethylene diamine   p-Xylylenediamine
Propylene diamine
Butylene diamine     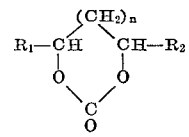
Hexamethylene diamine   p-Phenylenediethylenediamine
Decamethylene diamine   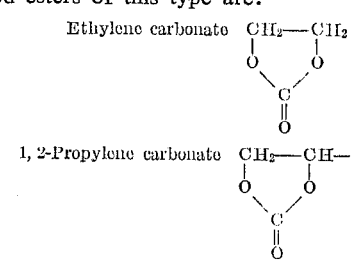
Dodecamethylene diamine
Diethylene triamine
Triethylene tetramine
Tetraethylene pentamine
Dipropylene triamine Carbonic acid esters of primary or secondary mono-alcohols or di-alcohols are also added as component (B) of the inventions. Especially three classes of carbonic acid esters may be used:

(1) Neutral symmetric or asymmetric carbon acid esters from linear or branched aliphatic, hydroaromatic or aromatic or mixed aromatic-aliphatic mono-alcohols of the formula $$R_1-O-\underset{\underset{O}{\|}}{C}-O-R_2$$

in which $R_1$ and $R_2$ are alkyl groups containing 2 to 12 carbon atoms respectively hydroaromatic rings with 5 to 6 carbon atoms or aryl- or alkaryl groups with side chains with up to 12 carbon atoms.

(2) Neutral cyclic carbon acid esters from aliphatic or hydroaromatic or aliphatic-aromatic di-alcohols of the formula

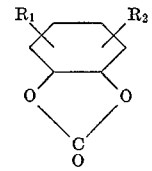

wherein $n$ is 0 or 1 and $R_1$ and $R_2$ are hydrogen or alkyl radicals with 1 to 4 carbon atoms or hydroaromatic ring structures with 5 or 6 carbon atoms or aryl- or alkaryl groups with side chains with up to 6 carbon atoms.

(3) Neutral cyclic carbon acid esters from aromatic or hydroaromatic 1,2-dihydroxy compounds of the formula

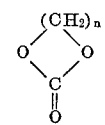

in which $R_1$ and $R_2$ are aliphatic side chains or alkoxy-groups with up to 6 carbon atoms. Ethylene carbonate is particularly suitable. However, carbonates of higher aliphatic di-alcohols and aliphatic mono-alcohols can also be used. Carbonic acid esters of aromatic compounds, e.g. diphenyl carbonate, can also be used. In general, it is preferable to employ relatively low molecular weight carbonic acid esters, e.g. of from 3 to 13 carbon atoms and especially 3 to 7 carbon atoms, including the carbon atom of the carbonic acid itself. These carbonic acid esters are essentially difunctional compounds or so-called "diesters" but they may be open-chained or cyclic compounds. For example, when using a dihydric alkanol to obtain the ester, it easily forms the ring structure:

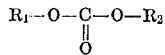

where $n$ is an integer of 2 or more. In addition, the alkylene portion of the ring may bear a lower alkyl substituent, preferably methyl, so as to yield a substituted cyclic ring. Preferred esters of this type are:

Ethylene carbonate
1,2-Propylene carbonate

On the other hand, monohydric alcohols can be used to form the open-chain diester of carbonic acid of the general formula:

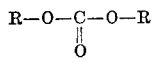

where R is alkyl, e.g. of 2 to 6 carbon atoms, or cycloalkyl, such as cyclohexyl, or aryl such as phenyl. Preferred esters of this type are:

Diethyl carbonate $CH_3CH_2—O—CO—O—CH_2CH_3$

Dipropyl carbonate $CH_3CH_2CH_2—O—CO—O—CH_2CH_2CH_3$

Diisopropyl carbonate $(CH_3)_2CH—O—CO—O—CH(CH_3)_2$

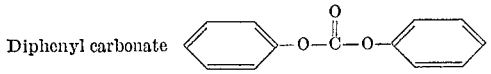
Diphenyl carbonate

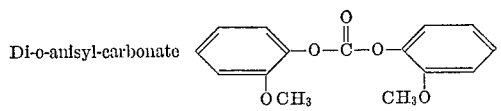
Di-o-anisyl-carbonate

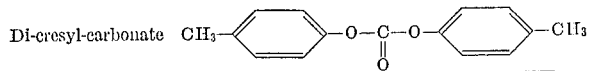
Di-cresyl-carbonate

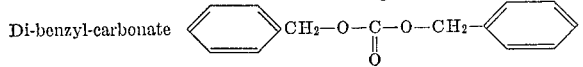
Di-benzyl-carbonate

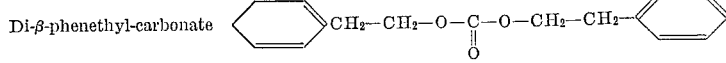
Di-β-phenethyl-carbonate

The two additives, i.e. the diamine and carbonic acid ester, can be added separately or in admixture with each other. This addition can take place prior to the polycondensation by admixture with the initial monomeric reactant required to produce the fiber-forming polyamide, or it can take place after the polycondensation has been initiated, preferably within the first one-third of the polycondensation reaction. The reaction which takes place in the presence of both components (A) and (B) is too complex to be determined with any degree of accuracy, although it is believed both components become incorporated in the polyamide chain and that this occurs in a manner which not only improves dyeability but also maintains a high solution viscosity. There may also be some reaction between components (A) and (B), although this appears to be relatively unlikely since the results achieved are not strongly affected by the molar ratio of (A):(B) which may fall in a range of about 7.5:1 to 1:25. The most desirable results are achieved in a range of (A):(B) of about 5:1 to 1:2.

No alteration of the conventional processing conditions used during the production of the polyamides or during the spinning of filaments is necessary. The polyamides can also be delustered in known manner by adding titanium dioxide. It is also surprisingly found that relatively large quantities of the delustering agent, e.g. 1.8 to 2.0% by weight, based on the polyamide, may be added without any agglomeration of the pigment particles taking place. Thus, it was to be expected that the presence of the additives according to the invention would cause the titanium to flocculate out, since this is known to occur with electrolytes.

The polyamides produced by the process according to the invention are completely white and are suitable for manufacture of filaments, threads, bristles, films and other shaped articles.

If, as described above, only the carbonic acid ester is added as a reaction acceleator to provide an ionic polycondensation of the lactam, the process being carried out under normal conditions and with increasing quantities of the carbonic acid ester being added to the lactam-water mixture, then the solution viscosity of the polyamide which is formed is considerably reduced. In the same way, and even more noticeable decrease in the solution viscosity of the polyamide product is found when only the diamine is added (see FIG. 1 of the accompanying drawings).

FIG. 1 is a graph of the solution viscosity (SV) of a polycaprolactam measured against the increasing molar percent of the addition solely of hexamethylene diamine (curve 1) and the addition solely of ethylene carbonate (curve 2).

If, however, the polycondensation of the lactam is carried out according to the invention, that is to say, with the addition of both a diamine (A) and a carbonic acid ester (B), then not only does the dyeability improve but the solution viscosity is found to increase with an increasing quantity of carbonic acid ester (see FIG. 2).

FIG. 2 is a graph of the solution viscosity (SV) of a number of polycaprolactams containing different amounts of hexamethylene diamine, showing the effect of increasing the content of ethylene carbanate. Curves 1, 2, 3 and 4 of FIG. 2 thus represent polyamides containing 0.290, 0.384, 0.481 and 0.576 mol percent of hexamethylene diamine, respectively. The points on the curves 1, 2, 3 and 4 are prepresented, respectively, by a circle, a triangle, a square and a cross.

This effect is quite surprising and was not foreseeable, especially since the reaction products 1,6-bis (β-hydroxyethylcarbamido)-n-hexane and 1-(β-hydroxyethylcarbamido)-6-amino-n-hexane, which are formed, for example, from ethylene carbonate and hexamethylene diamine at moderately elevated temperatures, are very effective as chain-breaking agents and, with an addition of comparable quantities, reduce the solution viscosity almost as strongly as hexamethylene diamine itself (see FIG. 3).

FIG. 3 is a graph of the solution viscosity (SV) of a polycaprolactam which contains an increasing mol percent of 1,6-bis-(hydroxymethyl-carbamido)-n-hexane. The term "carbamido" in naming these compounds is intended to identify the divalent radical —NH·COO—, sometimes identified as the "carbamic" radical.

The process is further illustrated by but not limited to the following examples.

EXAMPLE 1

A mixture of 4,750 g. of caprolactam, 250 g. of water and various quantities of the diamine and carbonic acid ester additives, is heated in a closed autoclave under nitrogen for one hour until the pressure has risen to 18 atm. The pressure is then released oved a period of 1¾ hours, the temperature of the melt being kept at 270° C. After this, oxygen-free nitrogen is passed over the melt for two hours and then the polyamide is withdrawn in a conventional manner in the form of a strip, band or rod while cooling. After granulation, the polyamide cuttings are extracted by boiling with water in order to remove low molecular weight fractions and are dried until they have a water content of 0.03%.

The values of the solution viscosities of the polyamide product and of the threads or fibers which are produced therefrom and the data concerning the dyeability are given in Table I, as follows. (The comparison samples were prepared under the conditions given in Example 1, but without addition of diamine and carbonic acid ester, respectively. However, as stabilizer 8.2 g.—0.16 mol percent—of benzoic acid was employed.)

TABLE I

| Example | Composition | Percent by wt.* | Mol percent | SV of granulated material | SV of threads | Extinction values/dyeing factor (F) |
|---|---|---|---|---|---|---|
| 1(a) | 4,750.0 g. caprolactam | | | 2.15 | 2.36 | Sample, 0.818; Comparison, 0.176/F, 4.6. |
|  | 250.0 g. water | | | | | |
|  | 14.25 g. hexamethylene diamine | 0.3 | 0.291 | | | |
|  | 14.25 g. ethylene carbonate | 0.3 | 0.383 | | | |
| 1(b) | 4,750.0 g. caprolactam | | | 2.30 | 2.50 | Sample, 0.770; Comparison, 0.168/F, 4.6. |
|  | 250.0 g. water | | | | | |
|  | 14.25 g. hexamethylene diamine | 0.3 | 0.290 | | | |
|  | 23.75 g. ethylene carbonate | 0.5 | 0.637 | | | |
| 1(c) | 4,750.0 g. caprolactam | | | 2.10 | 2.25 | Sample, 1.075; Comparison, 0.196/F, 5.5. |
|  | 250.0 g. water | | | | | |
|  | 19.00 g. hexamethylene diamine | 0.4 | 0.386 | | | |
|  | 23.75 g. ethylene carbonate | 0.5 | 0.636 | | | |
| 1(d) | 4,750.0 g. caprolactum | | | 2.18 | 2.37 | Sample, 1.010; Comparison, 0.195/F, 5.2. |
|  | 250.0 g. water | | | | | |
|  | 19.00 g. hexamethylene diamine | 0.4 | 0.384 | | | |
|  | 35.62 g. ethylene carbonate | 0.75 | 0.951 | | | |
| 1(e) | 4,750.0 g. caprolactum | | | 2.01 | 2.12 | Sample, 0.870; Comparison, 0.102/F, 8.5. |
|  | 250.0 g. water | | | | | |
|  | 23.75 g. hexamethylene diamine | 0.5 | 0.483 | | | |
|  | 23.75 g. ethylene carbonate | 0.5 | 0.635 | | | |
| 1(f) | 4,750.0 g. caprolactam | | | 2.10 | 2.33 | Sample, 1.010; Comparison, 0.136/F, 7.4. |
|  | 250.0 g. water | | | | | |
|  | 23.75 g. hexamethylene diamine | 0.5 | 0.481 | | | |
|  | 38.00 g. ethylene carbonate | 0.8 | 1.013 | | | |
| 1(g) | 4,750.0 g. caprolactam | | | 2.12 | 2.35 | Sample, 0.850; Comparison, 0.166/F, 5.1. |
|  | 250.0 g. water | | | | | |
|  | 7.36 g. ethylene diamine | 0.155 | 0.290 | | | |
|  | 14.25 g. ethylene carbonate | 0.3 | 0.383 | | | |
| 1(h) | 4,750.0 g. caprolactam | | | 2.11 | 2.30 | Sample, 0.825; Comparison, 0.178/F, 4.6. |
|  | 250.0 g. water | | | | | |
|  | 21.10 g. decamethylene diamine | 0.444 | 0.290 | | | |
|  | 14.25 g. ethylene carbonate | 0.3 | 0.383 | | | |
| 1(i) | 4,750.0 g. caprolactam | | | 2.06 | 2.24 | Sample, 0.750; Comparison, 0.171/F, 4.4. |
|  | 250.0 g. water | | | | | |
|  | 24.65 g. dodecamethylene diamine | 0.518 | 0.290 | | | |
|  | 14.25 g. ethylene carbonate | 0.3 | 0.383 | | | |
| 1(j) | 4,750.0 g. caprolactam | | | 2.16 | 2.33 | Sample, 0.800; Comparison, 0.185/F, 4.3. |
|  | 250.0 g. water | | | | | |
|  | 15.20 g. triethylene tetramine | 0.32 | 0.246 | | | |
|  | 14.25 g. ethylene carbonate | 0.3 | 0.383 | | | |
| 1(k) | 4,750.0 g. caprolactam | | | 2.04 | 2.17 | Sample, 0.885; Comparison, 0.147/F, 6.0. |
|  | 250.0 g. water | | | | | |
|  | 23.28 g. tetraethylene pentamine | 0.49 | 0.291 | | | |
|  | 14.25 g. ethylene carbonate | 0.3 | 0.383 | | | |
| 1(l) | 4,750.0 g. caprolactam | | | 2.09 | 2.25 | Sample, 0.805; Comparison, 0.174/F, 4.7. |
|  | 250.0 g. water | | | | | |
|  | 14.25 g. hexamethylene diamine | 0.3 | 0.290 | | | |
|  | 19.00 g. diethyl carbonate | 0.4 | 0.381 | | | |
| 1(m) | 4,750.0 g. caprolactam | | | 2.14 | 2.35 | Sample, 0.880; Comparison, 0.184/F, 4.8. |
|  | 250.0 g. water | | | | | |
|  | 14.25 g. hexamethylene diamine | 0.3 | 0.290 | | | |
|  | 16.63 g. 1,2-propylene carbonate | 0.35 | 0.382 | | | |
| 1(n) | 4,750.0 g. caprolactam | | | 2.15 | 2.43 | Sample, 0.840; Comparison, 0.177/F, 4.8. |
|  | 250.0 g. water | | | | | |
|  | 14.25 g. hexamethylene diamine | 0.3 | 0.291 | | | |
|  | 21.38 g. diphenyl carbonate | 0.45 | 0.236 | | | |

*With reference to caprolactam.
NOTE.—SV = Solution viscosity.

EXAMPLE 2

A solution of 6,000 g. of hexamethylene diammonium adipate (AH-salt) in 4,000 g. of water, is mixed with varying quantities of hexamethylene diamine and ethylene carbonate and then the polycondensation is carried out in a closed autoclave under a nitrogen atmosphere. In the first reaction stage, the operation takes place at a pressure of 18 atm. and a temperature of 255° C. The pressure is then released over two hours to normal pressure while the temperature is raised to 273° C., and finally nitrogen is passed over the melt for about 45 minutes. The polyamide is then removed from the autoclave in the manner described in Example 1 in the form of a strip and granulated, and the cuttings are then melt-spun into filaments. The results of the tests are given in the following Table II. (The comparison samples were prepared under the conditions given in Example 2, but without addition of diamine and carbonic acid ester, respectively. However, 6.18 g.—0.45 mol percent—of acetic acid as a stabilizer has been added.)

TABLE II

| Example | Composition | Percent by wt.* | Mol percent | SV of granulated material | SV of threads | Extinction values/dyeing factor (F) |
|---|---|---|---|---|---|---|
| 2(a) | 6,000.0 g. AH-salt | | | 2.28 | 2.41 | Sample, 0.810; Comparison, 0.204/F, 4.0. |
|  | 4,000.0 g. water | | | | | |
|  | 15.54 g. hexamethylene diamine | 0.3 | 0.290 | | | |
|  | 15.54 g. ethylene carbonate | 0.3 | 0.383 | | | |
| 2(b) | 6,000.0 g. AH-salt | | | 2.30 | 2.38 | Sample, 1.070; Comparison, 0.342/F, 3.1. |
|  | 4,000.0 g. water | | | | | |
|  | 20.71 g. hexamethylene diamine | 0.4 | 0.388 | | | |
|  | 5.09 g. ethylene carbonate | 0.1 | 0.128 | | | |
| 2(c) | 6,000.0 g. AH-salt | | | 2.28 | 2.41 | Sample, 0.800; Comparison, 0.195/F, 4.1. |
|  | 4,000.0 g. water | | | | | |
|  | 20.71 g. hexamethylene diamine | 0.4 | 0.387 | | | |
|  | 10.36 g. ethylene carbonate | 0.2 | 0.255 | | | |
| 2(d) | 6,000.0 g. AH-salt | | | 2.32 | 2.32 | Sample, 0.855; Comparison, 0.160/F, 5.3. |
|  | 4,000.0 g. water | | | | | |
|  | 20.71 g. hexamethylene diamine | 0.4 | 0.387 | | | |
|  | 15.54 g. ethylene carbonate | 0.3 | 0.383 | | | |
| 2(e) | 6,000.0 g. AH-salt | | | 2.31 | 2.42 | Sample, 0.900; Comparison, 0.205/F, 4.3. |
|  | 4,000.0 g. water | | | | | |
|  | 20.71 g. hexamethylene diamine | 0.4 | 0.383 | | | |
|  | 50.89 g. ethylene carbonate | 1.0 | 1.266 | | | |

TABLE II.—Continued

| Example | Composition | Percent by wt.* | Mol percent | SV of granulated material | SV of threads | Extinction values/dyeing factor (F) |
|---|---|---|---|---|---|---|
| 2(f) | 6,000.0 g. AH-salt | | | 2.22 | 2.30 | Sample, 0.830; Comparison, 0.163/F, 5.1. |
| | 4,000.0 g. water | | | | | |
| | 25.90 g. hexamethylene diamine | 0.5 | 0.485 | | | |
| | 5.09 g. ethylene carbonate | 0.1 | 0.128 | | | |
| 2(g) | 6,000.0 g. AH-salt | | | 2.24 | 2.41 | Sample, 0.850; Comparison, 0.155/F, 5.5. |
| | 4,000.0 g. water | | | | | |
| | 25.90 g. hexamethylene diamine | 0.5 | 0.482 | | | |
| | 25.90 g. ethylene carbonate | 0.5 | 0.636 | | | |
| 2(h) | 6,000.0 g. AH-salt | | | 2.11 | 2.37 | Sample, 0.810; Comparison, 0.130/F, 6.2. |
| | 4,000.0 g. water | | | | | |
| | 31.10 g. hexamethylene diamine | 0.6 | 0.583 | | | |
| | 5.09 g. ethylene carbonate | 0.1 | 0.128 | | | |
| 2(i) | 6,000.0 g. AH-salt | | | 2.12 | 2.36 | Sample, 0.860; Comparison, 0.154/F, 5.6. |
| | 4,000.0 g. water | | | | | |
| | 31.10 g. hexamethylene diamine | 0.6 | 0.582 | | | |
| | 15.54 g. ethylene carbonate | 0.3 | 0.382 | | | |
| 2(j) | 6,000.0 g. AH-salt | | | 2.01 | 2.26 | Sample, 0.890; Comparlosn, 0.137/F, 6.5. |
| | 4,000.0 g. water | | | | | |
| | 38.85 g. hexamethylene diamine | 0.75 | 0.724 | | | |
| | 5.09 g. ethylene carbonate | 0.1 | 0.128 | | | |
| 2(k) | 6,000.0 g. AH-salt | | | 2.06 | 2.36 | Sample, 0.770; Comparison, 0.100/F, 7.7. |
| | 4,000.0 g. water | | | | | |
| | 38.85 g. hexamethylene diamine | 0.75 | 0.724 | | | |
| | 10.36 g. ethylene carbonate | 0.2 | 0.255 | | | |

*Based on 100 parts by weight of condensate (AH-salt).

EXAMPLE 3

A mixture consisting of 95 parts of caprolactam, 5 parts of water, 0.475 part (=0.484 mol percent) of hexamethylene diamine and 0.19 part (=0.255 mol percent) of ethylene carbonate, to which are added 1.02 parts of a water-containing titanium dioxide paste with a $TiO_2$ content of 28% by weight, is polycondensed in a conventional manner in a VI tube. The residence time of the reaction mixture in the VK tube is about 22 hours. The polyamide is withdrawn in the form of a strip and granulated. After the usual extraction, a solution viscosity of 2.1 is found. The $TiO_2$ content amounts to 0.3%.

EXAMPLE 4

The process is carried out as in Example 3, but 0.95 part (=1.254 mol percent) of ethylene carbonate and 5.5 parts of an aqueous titanium dioxide paste (28% by weight) are added to the reaction mixture as well as 0.475 part of hexamethylene diamine. The polyamide which is formed contains 1.8% of $TiO_2$ in very finely divided form with particle sizes below 2 millimicrons.

The following values were obtained in the two preceding examples:

| Example | 3 | 4 |
|---|---|---|
| SV of cuttings | 2.1 | 2.12 |
| SV of filaments | 2.14 | 2.24 |
| Dyeing factor (F) | 7.5 | 12.3 |
| Extinction | 0.780 | 0.948 |
| Extinction (comparison sample) | 0.104 | 0.077 |

(The comparison samples were prepared under the conditions given in Examples 3 and 4, but without addition of diamine and carbonic acid ester, respectively. However, as stabilizer 0.16 mol percent of benzoic acid was employed.)

The following examples serve to illustrate the technical advantages offered by the process according to the invention, when compared with known procedures, in which diamines or carbonic acid esters alone were used in the polycondensation of polyamides. In addition, the effect of adding a reaction product of a diamine and a carbonic acid ester is also shown.

COMPARISON EXAMPLE A

The polycondensation of caprolactam is carried out as given in Example 1, an increased quantity of hexamethylene diamine, but no carbonic acid ester, being used as the additive. The results of the tests are given in Table III below. While a comparatively large increase in the dyeability is obtained, the solution viscosities also decreased considerably.

COMPARISON EXAMPLE B

This example is carried out according to Example 1, but with the difference that only ethylene carbonate, in an increased quantity, is used as the additive. As can be seen from Table IV below, in which the results of the tests are given, only an insignificant improvement in the dyeability is achieved; the solution viscosities also decreased to some extent.

COMPARISON EXAMPLE C

Example 1 is repeated, but with addition of 1,6-bis-(β-hydroxyethyl-carbamido)-n-hexane, which is the reaction product of 2 mols of ethylene carbonate and 1 mol of hexamethylene diamine. The results of the tests are shown in Table V below, from which it can be seen that, with a good rise in the dyeability, the solution viscosity decreases with an increasing quantity of the additive.

TABLE III

| Comparison Example | Composition | Percent by wt.[1] | Mol percent | SV of granulated material | SV of threads | Extinction values/dyeing factor (F) |
|---|---|---|---|---|---|---|
| A(a) | 4,750.0 g. caprolactam | | | 2.29 | 2.58 | |
| | 250.0 g. water | | | | | |
| A(b) | 4,750.0 g. caprolactam | | | 2.07 | 2.23 | Sample 0.845; Comparison 0.165; F 5.1 |
| | 250.0 g. water | | | | | |
| | 14.3 g. hexamethylene diamine | 0.3 | 0.292 | | | |
| A(c) | 4,750.0 g. caprolactam | | | 1.96 | 2.05 | Sample 0.790; Comparison 0.113; F 7.0 |
| | 250.0 g. water | | | | | |
| | 19.0 g. hexamethylene diamine | 0.4 | 0.396 | | | |
| A(d) | 4,750.0 g. caprolactam | | | 1.88 | 1.99 | Sample 0.910; Comparison 0.125; F 7.3 |
| | 250.0 g. water | | | | | |
| | 23.75 g. hexamethylene diamine | 0.5 | 0.485 | | | |
| A(e) | 4,750.0 g. caprolactam | | | 1.80 | 1.84 | Sample 0.845; Comparison 0.096; F 8.8 |
| | 250.0 g. water | | | | | |
| | 28.5 g. hexamethylene diamine | 0.6 | 0.581 | | | |

[1] Based on caprolactam.

TABLE IV

| Comparison Example | Additives[1] | Mol percent[2] | SV of granulated material | SV of threads | Extinctions | | Dyeing factor |
|---|---|---|---|---|---|---|---|
| B(a) | 11.88 g. ethylene carbonate | 0.322 | 2.30 | 2.58 | Sample | 0.558 | 1.6 |
|  |  |  |  |  | Comparison | 0.353 |  |
| B(b) | 23.76 g. ethylene carbonate | 0.643 | 2.24 | 2.40 | Sample | 0.620 | 1.6 |
|  |  |  |  |  | Comparison | 0.398 |  |
| B(c) | 35.63 g. ethylene carbonate | 0.965 | 2.24 | 2.54 | Sample | 0.620 | 1.8 |
|  |  |  |  |  | Comparison | 0.354 |  |
| B(d) | 47.50 g. ethylene carbonate | 1.242 | 2.18 | 2.42 | Sample | 0.692 | 1.5 |
|  |  |  |  |  | Comparison | 0.452 |  |
| B(e) | 59.39 g. ethylene carbonate | 1.607 | 2.20 | 2.49 | Sample | 0.648 | 2.0 |
|  |  |  |  |  | Comparison | 0.323 |  |

[1] Quantities added to the initial mixture: 4,750 g. caprolactam and 250 g. water.
[2] Based on caprolactam.

TABLE V

| Comparison Example | Additives[1] | Mol percent[2] | SV of granulated material | SV of threads | Extinctions | | Dyeing factor |
|---|---|---|---|---|---|---|---|
| C(a) | 23.75 g. 1,6-bis-(d-hydroxyethyl carbamido)-n-hexane | 0.194 | 2.17 | 2.23 | Sample | 0.820 | 3.8 |
|  |  |  |  |  | Comparison | 0.219 |  |
| C(b) | 35.62 g. 1,6-bis-(d-hydroxyethyl carbamido)-n-hexane | 0.291 | 2.12 | 2.31 | Sample | 0.900 | 4.9 |
|  |  |  |  |  | Comparison | 0.183 |  |
| C(c) | 47.50 g. 1,6-bis-(d-hydroxyethyl carbamido)-n-hexane | 0.387 | 2.00 | 2.12 | Sample | 0.950 | 5.9 |
|  |  |  |  |  | Comparison | 0.160 |  |
| C(d) | 59.88 g. 1,6-bis-(d-hydroxyethyl carbamido)-n-hexane | 0.500 | 1.96 | 2.05 | Sample | 0.900 | 6.9 |
| C(e) | 71.75 g. 1,6-bis-(d-hydroxyethyl carbamido)-n-hexane | 0.585 | 1.90 | 2.00 | Sample | 0.893 | 7.8 |
|  |  |  |  |  | Comparison | 0.115 |  |

[1] Quantities added to the initial mixture: 4,750 g. caprolactam and 250 g. water.
[2] Based on caprolactam.

The following description relates to the determination of solution viscosity (SV) and the dyeing factor (F) as set forth in the preceding examples and also in the graphs of the drawing:

The solution viscosity (SV) is determined as a 1% by weight solution of the polyamide product in 90% formic acid at 25° C.

In order to establish the dyeability, sample of knitwear fabric are produced both from the filamentary material to be tested and from a comparison thread, and the samples are dyed and tested in accordance with the following steps.

The samples are washed with a non-ionic detergent in a bath adjusted with acetic acid to a pH value of 5 and then rinsed with water.

For the dyeing operation, an aqueous dyestuff solution is used. This solution, based on the weight of the samples or specimens, contains 1% of Anthralanblau B (Acid Blue 41, Colour Index No. 62,130) and a non-ionic wetting agent. The bath solution ratio is 1:50. The samples are placed in the cold dye bath solution, which is then heated during 45 minutes to its boiling point and is maintained for another 15 minutes at this temperature. It is then cooled and dilute acetic acid is added to the dye bath to adjust the pH value to 5. The dyeing is then fixed by boiling for 10 minutes. The samples are washed with water and dried.

In order to establish the quantities of dyestuff absorbed, 500 mg. of the sample and comparison fabric materials are each completely decolorized with 100 ml. of 30% aqueous pyridine. The extinctions of the dyestuff solutions thus obtained are determined with a spectral photometer at a wavelength of 640 millimicrons.

The dyeing factor F is given by the equation:

$$F = \frac{\text{Extinction of the test solution}}{\text{Extinction of the comparison solution}}$$

F is thus the ratio by which the test material was more strongly dyed than the comparison material.

The invention is hereby claimed as follows:

1. A process for improving the dyeability of a fiber-forming synthetic linear polyamide which is a polycondensate of a monomeric reactant selected from the class consisting of a lactam, an ω-aminocarboxylic acid and a mixture or salt of a substantially equimolar proportion each of a dicarboxylic acid and a diamine, which process comprises carrying out the polycondensation of said monomeric reactant in the presence of at least about 2% by weight of water, with reference to the total reaction mixture, and with an addition to said monomeric reactant of a mixture of reactive components consisting essentially of (A) 0.1 to 0.75 mol percent of a diamine of the formula $$H_2N-R-NH_2$$

in which R is an alkylene group containing 2 to 12 carbon atoms, a hydroaromatic ring structure with 5 or 6 carbon atoms or the group:

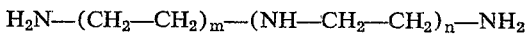

wherein m and n are numbers from 1 to 5; or an aliphatic polyamine of the formula $$H_2N-(CH_2-CH_2)_m-(NH-CH_2-CH_2)_n-NH_2$$

wherein m is a number from 1 to 6 and n from 1 to 4, and (B) 0.1 to 2.5 mol percent of a carbonic acid ester of an alcohol selected from the class consisting of primary and secondary mono- and di-hydric alcohols, the molar percentages being taken with reference to the number of mols of the monomeric reactant.

2. A process as claimed in claim 1 wherein component (A) is added in an amount of 0.3 to 0.6 mol percent and component (B) is added in an amount of 0.3 to 0.5 mol percent.

3. A process as claimed in claim 1 wherein the initial monomeric reactant is caprolactam.

4. A process as claimed in claim 1 wherein the initial monomeric reactant is hexamethylene diammonium adipate.

5. A process as claimed in claim 1 wherein components (A) and (B) are added separately at a point prior to or during the polycondensation of the initial monomeric reactant.

6. A process as claimed in claim 1 wherein components (A) and (B) are added in admixture with each other at a point prior to or during the polycondensation of the initial monomeric reactant.

7. A process as claimed in claim 1 wherein component (A) is hexamethylene diamine and component (B) is ethylene carbonate.

8. A process as claimed in claim 1 wherein component (A) is ethylene diamine and component (B) is ethylene carbonate.

9. A process as claimed in claim 1 wherein component (A) is decamethylene diamine and component (B) is ethylene carbonate.

10. A process as claimed in claim 1 wherein component (A) is hexamethylene diamine and component (B) is diethyl carbonate.

11. A process as claimed in claim 1 wherein component (A) is hexamethylene diamine and component (B) is 1,2-propylene carbonate.

12. A process as claimed in claim 1 wherein component (A) is hexamethylene diamine and component (B) is diphenyl carbonate.

13. A process as claimed in claim 1 wherein component (A) is an alkylene diamine containing secondary amino groups in a linear alkylene chain having terminal primary amino groups.

14. A process as claimed in claim 1 wherein component (A) is a linear alkylene diamine containing only two primary amino groups at the terminal positions of the alkylene chain.

References Cited

UNITED STATES PATENTS

| | | | |
|---|---|---|---|
| 2,241,321 | 5/1941 | Schlack | 260—78 |
| 2,835,653 | 5/1958 | Haas et al. | 260—78 |
| 3,239,490 | 3/1966 | Gee et al. | 260—78 |
| 3,304,289 | 2/1967 | Ballentine et al. | 260—78 |
| 3,437,641 | 4/1969 | Lenz et al. | 260—78 |

HAROLD D. ANDERSON, Primary Examiner

U.S. Cl. X.R.

260—77.5 D, 78 A, 78 L, 78 TF

UNITED STATES PATENT OFFICE
CERTIFICATE OF CORRECTION

Patent No. 3,644,298  Dated February 22, 1972

Inventor(s) Klaus Gerlach, Wolfgang Grimm, and Helmut Linhart

It is certified that error appears in the above-identified patent and that said Letters Patent are hereby corrected as shown below:

Column 5, lines 25 to 28, "Di-β-phenethyl-carbonate  should read -- Di-β-phenylethyl-carbonate 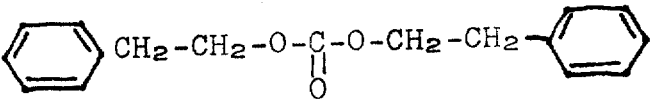 --.

Column 5, line 67, "acceleator" should read -- accelerator --.

Column 11, Table V, under "additives", examples "C(a)" through "C(e)", each occurrence, "1,6-bis-d-hydroxyethyl" should read -- 1,6-bis-β-hydroxyethyl --; line 36, "sample" should read -- samples --.

Signed and sealed this 3rd day of October 1972.

(SEAL)
Attest:

EDWARD M. FLETCHER, JR.
Attesting Officer

ROBERT GOTTSCHALK
Commissioner of Patents